United States Patent [19]

Hunter

[11] Patent Number: 5,202,017
[45] Date of Patent: Apr. 13, 1993

[54] CONTINUOUS MEDIA FILTER WITH MONITORING OF LIQUID LEVEL IN DISTRIBUTOR

[76] Inventor: Grey O. Hunter, R.R. 5, Box 116, Queensbury, N.Y. 12804

[21] Appl. No.: 747,987

[22] Filed: Aug. 21, 1991

[51] Int. Cl.$^5$ .................. B01D 33/80; B01D 33/048
[52] U.S. Cl. ...................................... 210/143; 210/86; 210/400; 210/408; 210/401
[58] Field of Search .................. 210/86, 97, 143, 396, 210/400, 401, 408, 744, 456, 770

[56] References Cited

U.S. PATENT DOCUMENTS

| | | | |
|---|---|---|---|
| 864,828 | 9/1907 | Callow | 210/400 |
| 1,334,160 | 3/1920 | Meston | 210/400 |
| 3,012,677 | 12/1961 | Hungate | 210/400 |
| 3,049,236 | 8/1962 | DeLara et al. | 210/770 |
| 3,677,411 | 7/1972 | Ishigaki | 210/393 |
| 3,706,378 | 12/1972 | Markwick | 210/107 |
| 3,734,313 | 5/1973 | Gauther et al. | 214/7 |
| 3,873,450 | 3/1975 | Lovegreen | 210/400 |
| 4,170,311 | 10/1979 | Spaw | 414/289 |
| 4,191,653 | 3/1980 | Hampton | 210/396 |
| 4,310,414 | 1/1982 | Lux | 210/400 |
| 4,341,628 | 7/1982 | Fujinami et al. | 210/401 |
| 4,514,301 | 4/1985 | Parshall | 210/400 |
| 4,597,865 | 7/1986 | Hunt et al. | 210/179 |
| 4,692,240 | 9/1987 | Arbuthnot et al. | 210/400 |
| 4,830,750 | 5/1989 | Jandourek | 210/393 |

*Primary Examiner*—Robert A. Dawson
*Assistant Examiner*—Joseph Drodge
*Attorney, Agent, or Firm*—Kevin R. Kepner

[57] ABSTRACT

A continuous media filter consisting of an inclined endless belt in contact with a reservior of contaminated slurry materials with provisions for altering the speed of the belt passing through the filtered material and also the angle of inclination of the belt in response to the volumetric flow of the contaminated material. The flow is determined by monitoring the level of the contaminated liquid in the reservoir with a level sensing device which gives an indication of how fast the liquid is passing through the media belt. As a result of the variables which can be adjusted the filter can be used as a high efficiency filter or a selective filtering means. With proper sizing the filter can be efficiently used in processes with variable flow rates without causing the bottleneck common to other filtering devices.

18 Claims, 2 Drawing Sheets

CONTINUOUS MEDIA FILTER WITH MONITORING OF LIQUID LEVEL IN DISTRIBUTOR

FIELD OF THE INVENTION

The present invention relates to filtering apparatus for filtering suspended solids from a suspension and more particularly to a filtering apparatus providing a variable capacity and a self cleaning filter media.

PRIOR ART

In the field of liquid/solids separation there have been several attempts made to develop a means to achieve separation efficiently on a continuous basis. With the many concepts that have been presented, there have been none that can achieve this due to the fact that most process systems have inherent variations in the approach flow of the slurry to be filtered.

By not having a means to compensate for these approach flow variations, these filters will become sealed over when the flow or solids levels increase. This allows the contaminated slurry to be carried forward, and in the case of a reduction of flow or solids level, the filter does not have time to build up a sufficient filter mat of contaminants to aid in filtering of the slurry.

Along with this shortcoming, there is also no way to maintain a constant operating head of pressure due to the fixed area of exposed filter media attempting to process varying rates in the approach flow of slurry to be filtered.

In the case of inclined static screens where the slurry to be processed cascades over a filter media, it is common that the media will become sealed off. This will allow the slurry to be carried forward when there are increases in flow. Another shortcoming of these devices is that there is no effective means to keep the media clean, thereby requiring stopping the approach flow and manually cleaning the media.

While most cylindrical drum and belt type filters have means of keeping the filter media clean, they are basically fixed area filters. The only means to compensate for variations in either approach flow rates or solids levels is to control the flow delivered to the filter. Since most processes have flucuations in their slurry to be processed, changing the flow to the filter can cause processing upsets within their entire systems.

Due to the aforementioned variables, there is presently no effective means of control with these systems to assure good filtering efficiency. This being the fact, these systems are in contradiction of accepted filtration theory and practice. The ideal means of filtering is to cause the solids to be separated to form a filter mat to aid in the separation while maintaining a controlled pressure head to aid in passage of the filtrate. This should be accomplished even though there are variations in the approach flow.

Rotary separation units such as described in U.S. Pat. No. 4,597,865 to Hunt provide effective filtration but are limited in the quantity of material that can be filtered and lead to bottleneck in the overall system operations.

Both filters such as those described in U.S. Pat. No. 4,830,750 to Jandourek and Nord and U.S. Pat. No. 3,891,549 do not provide an elevation head to assist in the filtering process, have no provision to vaccuum assist the filtering process, are again limited in flow capacity.

SUMMARY OF THE INVENTION

The intent of this invention is to provide an efficient means of liquid solids separation whereby a constant head of pressure and an optimum thickness of filter mat can be controlled regardless of variations in approach flow or solids concentrations.

The elevation head above the filter media is a function of the volume of flow to the filter, the thickness of the filter mat of separated solids, and the amount of area of clean filter media exposed to the slurry.

In the present invention the filter belt will be in an inclined mode to and in the passage of the liquid. The filter belt media will be of woven man made, natural or metallic material of a suitable porosity to meet process needs. The filter media is easily changed to provide versatility in the overall process. The angle of incline will also be adjustable to suit the process.

The solids bearing slurry will be distributed on the filter media from a reservior located above the media. As a result of the build up of liquid in the reservior the filtering process can be accomplished purely by means of gravity.

The reservoir above the inclined filter media will have a device to sense the liquid level therein. When there is an increase of approach flow or solids/liquid ratio, the filter media will become more restricted, raising the level in the reservoir thereby signalling the motor driving the filter media to increase its speed. By increasing the area of washed filter media exposed to the slurry, the level in the resevoir will be lowered to the desired point. When there is a decrease in either the flow or solids/liquid ratio, the reverse would be true.

The controlled depth of the liquid in the reservoir can be set at any desired level and with proper sizing of the filter media and reservoir to the process will enable the filter to operate efficiently even with variations of slurry volume as well as variations in the liquid/solid ratio of the slurry itself. It is another feature of the filter that by varying the present reservoir level, the filter can function as either a very efficient filter, i.e. a high head level producing greater filtering pressure, or as a selective filtering device, i.e. a low head level so that only larger solids will be separated from the slurry.

The filter media is supported on three rollers, one to drive the media, one to serve as a guide for the media and to keep it centered under the resevior and the third to provide tension to the media to prevent slipping on the drive roll and to maintain a seal with the resevior. Depending on the process application the media is further supported under the resevior in a manner to aid in liquid removal, by means of rolls, foils or some sort of perforated grid.

Additionally, the invention provides the means to apply a vaccuum to the under side of the filter media to aid in removal of the liquids. Further dewatering of the filter can be accomplished by the addition of a roll riding on the fabric over the discharge roll. There are also several methods to remove the collected solids from the filter media, those being to scrape the belt, use an air or liquid shower or any combination of the above to accomplish a cleaning of the filter media.

DETAILED DESCRIPTION OF PROFERRED EMBODIMENT

Figure 1:
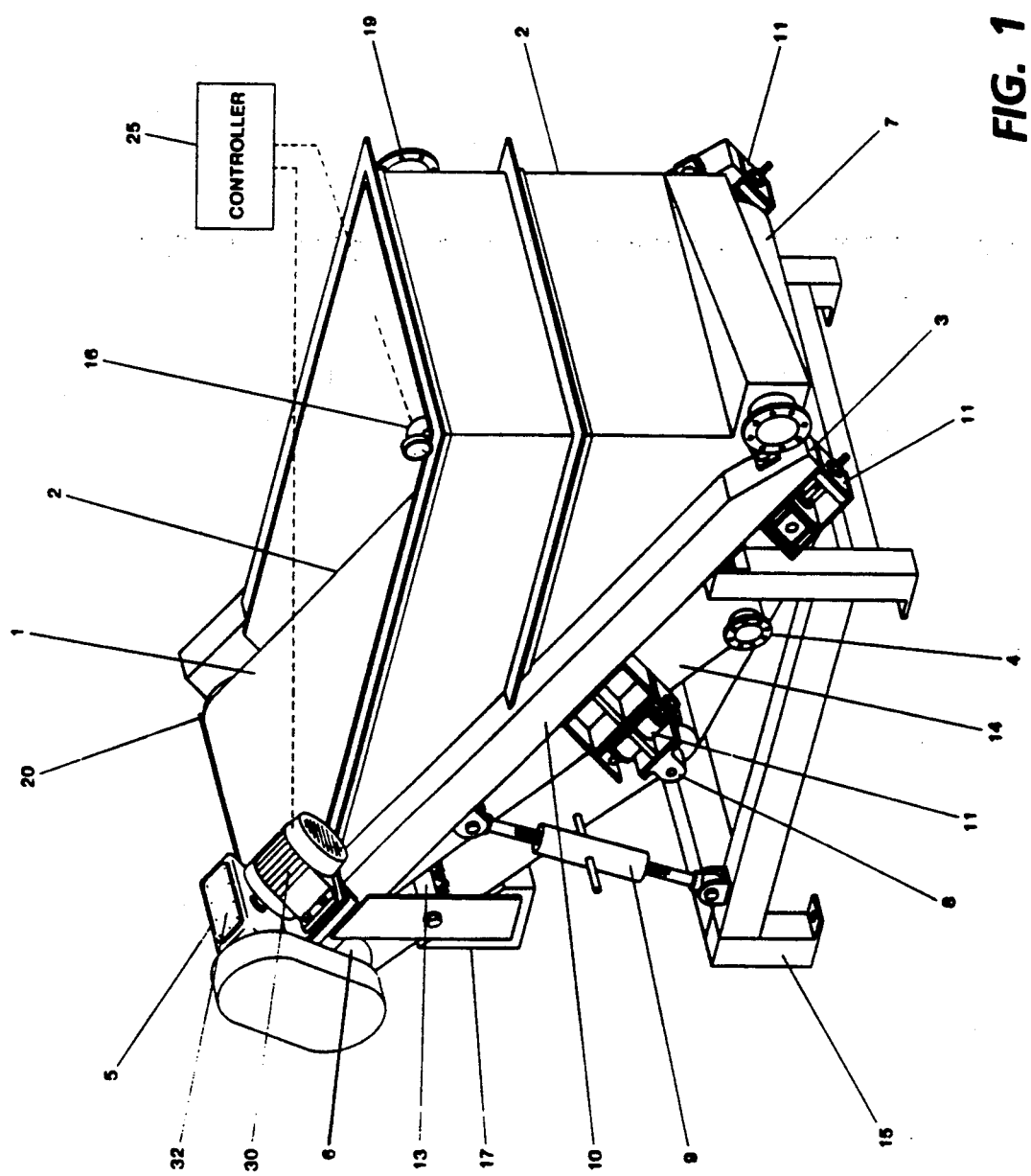
FIG. 1 is a perspective view of the of the present invention.
}

As seen in FIG. 1 the preferred embodiment consists of a filter media belt 1 supported by a drive roller 6, a guide roller 7 and a tension roller 8. The rollers are supported by an inclined frame member 10 and a tension adjusting member 12. The inclined frame member 10 is attached at one end to a base 15 and at approximately its midpoint to the base 15 by an inclination adjusting cylinder 9.

The liquid reservoir 2 rests on top of the filter media 1 and there is a flexible seal along the bottom of the resevior 2 where it meets the media 1. A collection tank 14 is located beneath the media 1.

There is also provided a filter media cleaning shower 13 and alignment device 11 to keep the media centered on the resevior.

In operation the liquid slurry enters the reservoir 2 through the inlet 3 and reaches the preset level. The variable speed drive mechanism, generally indicated by the reference numeral 5, which consists of a variable speed motor 30 and a drive coupling device 32 5 causes the drive roller 6 to rotate thereby moving the media 1 through the liquid in the reservoir. The level sensing device 16 records the rate at which the liquid is passing through the filter media 1 (the level of the liquid being a function of the rate of flow through the media belt) and causes the machine drive speed controller 25 to adjust the variable drive mechanism 5 to vary the speed of the drive roller 6 in response to a signal from the level sensing device 16 to maintain a level in the reservoir 2 within the desired parameters.

As the filtered liquid passes through the media 1 it is collected in the collector tank 14 and distributed out the distribution header 4. An overflow 19 is provided which recirculates contaminated material to the reservoir 2.

The filter media is cleaned by means of a high pressure water shower 13 and the waste material and contaminated water run off in the waste trough 17. In another embodiment air jets are used either alone or in combination with the water shower to clear the filter media.

Figure 2:
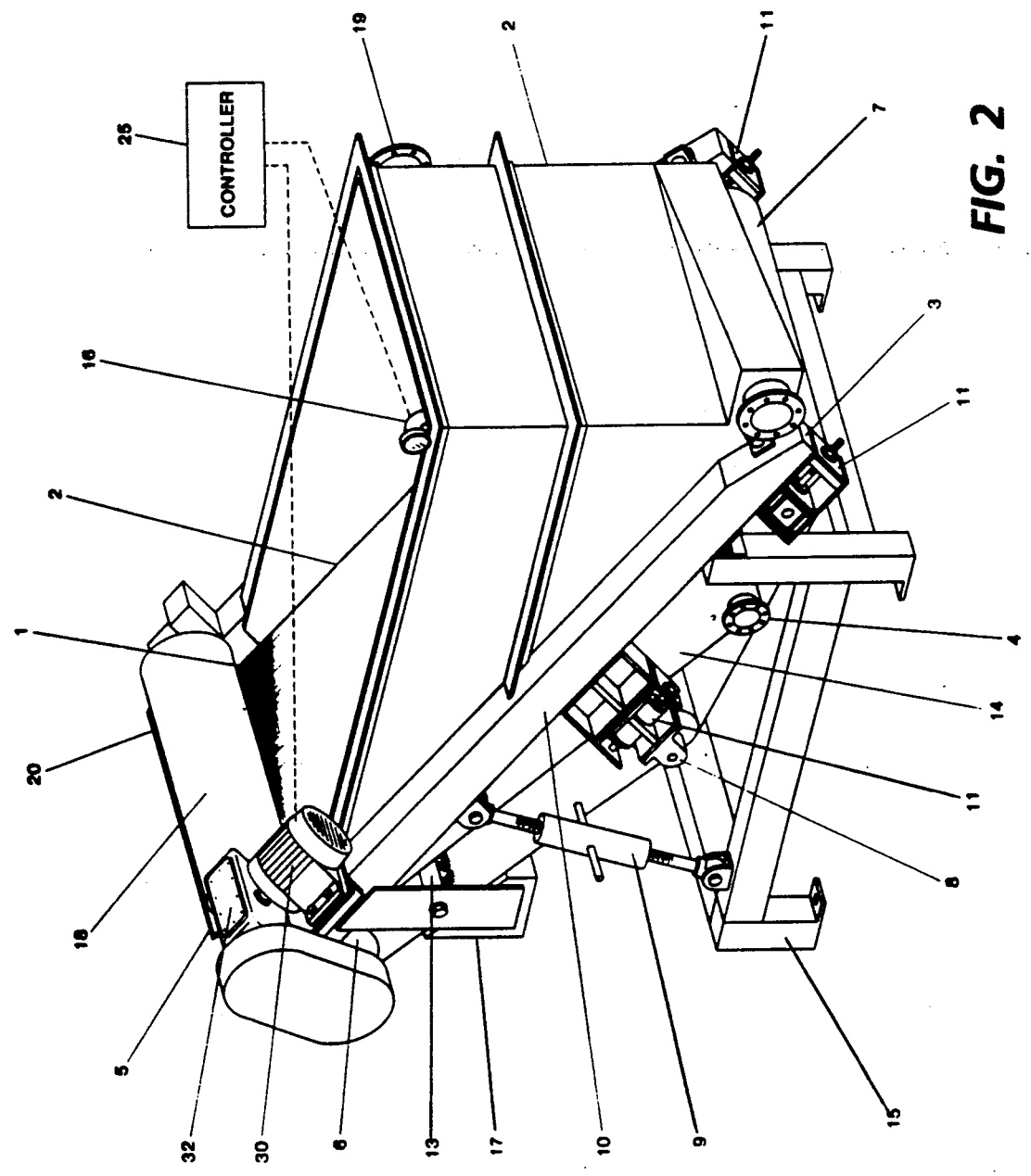
FIG. 2 is a perspective view of a second embodiment of the present invention.

The belt 1 can further dewatered by means of an additional roller 18 operating to compress the material on the belt 1 as seen in FIG. 2. A scraper blade 20 can be employed to further clean the belt 1.

What is claimed is:

1. A continuous media filter device comprising:
    an endless filter media belt extending around a plurality of rollers and along an inclined frame;
    a means for retaining and distributing a liquid contaminated with particles onto said filter media belt;
    a means for monitoring the level of said contaminated liquid in said retaining and distributing means;
    a means to advance said filter media belt around said rollers;
    a means to control the speed of the advancement of said filter belt media around said rollers;
    means for varying the area of filter media belt submerged in the particle contaminated liquid by adjusting the inclination of the frame;
    a collection and distribution means for retaining and distributing filtered liquid; and
    a means for cleaning said filter belt media.

2. A filter device as described in claim 1 wherein:
    said endless filter media belt extends around said rollers in a manner so as to form an inclined media surface in contact with said contaminated liquid between a first roller and a second roller and a second surface spanning an area between said second roller and a third roller said second surface and a third surface spanning an area between said third roller and said first roller so that one of said spanning surfaces is exposed to said cleaning means;
    said retaining and distributing means comprises a reservoir attached to said filter media belt inclined surface;
    said monitoring device comprises a high/low level sensing device fixedly attached to said reservoir; and
    said filter media belt advance means comprises a drive roller comprising a variable speed motor adapted to rotatably drive said second roller;
    said filter media speed control means comprises a speed controller adapted to control the drive speed of said variable speed motor in response to a signal from said high/low level sensing device; and
    said collection and distribution means comprises a second reservoir with a distribution header located so as to facilitate the discharge of filtered liquid from said filter device.

3. A device as described in claim 2 wherein; said means for cleaning comprises a scraper blade device in contact with said second surface of said filter media belt and a liquid high pressure shower device discharging on said second surface of said filter media belt.

4. A device as described in claim 3 wherein;
    said means for cleaning additionally comprises a high pressure air blast.

5. A device as described in claim 4 wherein;
    said filter media belt comprises a woven metallic material.

6. A device as described in claim 4 wherein;
    said filter media belt comprises a woven natural fibrous material.

7. A device as described in claim 4 wherein;
    said filter media belt comprises a woven man made material.

8. A device as described in claim 3 wherein;
    said filter media belt comprises a woven metallic material.

9. A device as described in claim 3 wherein;
    said filter media belt comprises a woven natural fibrous material.

10. A device as described in claim 3 wherein;
    said filter media belt comprises a woven man made material.

11. A device as described in claim 2 wherein;
    said means for cleaning comprises a compressing roller adapted to compress said filter media belt between said compressing roller and said drive roller.

12. A device as described in claim 11 wherein;
    said means for cleaning additionally comprises a high pressure air blast.

13. A device as described in claim 12 wherein;
    said filter media belt comprises a woven metallic material.

14. A device as described in claim 12 wherein;
    said filter media belt comprises a woven natural fibrous material.

15. A device as described in claim 12 wherein;

said filter media belt comprises a woven man made material.
16. A device as described in claim 11 wherein; said filter media belt comprises a woven metallic material.
17. A device as described in claim 11 wherein; said filter media belt comprises a woven natural fibrous material.
18. A device as described wherein claim 11 wherein; said filter media belt comprises a woven man made material.

* * * * *